United States Patent [19]

Muller et al.

[11] 4,296,530
[45] Oct. 27, 1981

[54] CLAMP FOR TRIM STRIP

[75] Inventors: Klaus Muller, Weilhaltinger; Gerhard Mack, Rheinfelden-Adelhausen, both of Fed. Rep. of Germany

[73] Assignee: A. Raymond, Lorrach, Fed. Rep. of Germany

[21] Appl. No.: 99,747

[22] Filed: Dec. 3, 1979

[30] Foreign Application Priority Data

Dec. 9, 1978 [DE] Fed. Rep. of Germany ....... 2853254

[51] Int. Cl.$^3$ .............................................. E04F 19/02
[52] U.S. Cl. ........................................ 24/295; 52/397; 52/718
[58] Field of Search .............. 24/73 B, 73 BC, 73 BP, 24/73 HS, 73 MF, 81 B, 81 FT, 81 BM; 52/397, 718

[56] References Cited

U.S. PATENT DOCUMENTS

| 3,235,209 | 2/1966 | Seckerson et al. | 24/81 B X |
| 3,371,900 | 3/1968 | Jacobs | 24/81 B X |
| 3,403,881 | 10/1968 | Bennett et al. | 24/73 HS |
| 3,631,569 | 1/1972 | Heath et al. | 51/718 X |
| 3,858,370 | 1/1975 | Halstead | 24/81 B X |

FOREIGN PATENT DOCUMENTS

| 1650965 | 2/1972 | Fed. Rep. of Germany . | |
| 1384230 | 11/1964 | France | 52/718 |
| 2340217 | 9/1977 | France | 52/397 |
| 781200 | 8/1957 | United Kingdom | 52/718 |

Primary Examiner—Thomas J. Holko
Attorney, Agent, or Firm—Finnegan, Henderson, Farabow, Garrett & Dunner

[57] ABSTRACT

A clamp for fastening trim or protective strips on support surfaces which includes a single strip of sheet metal formed to three spaced, superposed legs, the outer legs being connected by a bridge, and the middle leg bent inwardly from the free end of the lower outer leg and extending toward the bridge and between the outer legs. The lower leg and bridge are slotted to slide or plug onto a shank of a T-shaped stud, the lower and middle leg clamping the top and bottom of the head of the stud. The upper and middle legs clamp a projection on the trim strip.

4 Claims, 4 Drawing Figures

CLAMP FOR TRIM STRIP

BACKGROUND OF THE INVENTION

This invention relates to clamps, and more particularly to a clamp constructed of spring sheet metal and used for fastening trim of protective strips on support surfaces, for instance at or in the window frame of an automobile body. The clamp is adapted to connect to each of a number of studs suitably fastened to the support surface at spaced positions therealong, for example, by welding. The clamp is formed from a single strip of sheet metal and is provided with a U-shaped slot for plug-on assembly onto the shank of the stud.

Trim strip clamps of this kind are known. One such clamp is disclosed in West German Pat. No. 1,650,965 and is constructed such that when connected to a T-shaped stud, one part of the clamp bears against the support surface while another part elastically engages the under side of the head of the stud. A locking tongue is provided in the clamp which engages either behind the shank or the stud head so that following connection, the clamp is immovably fixed to the stud. After a clamp is fixed to each of the studs, the trim strip is secured in place by inserting a suitably shaped projecting portion on the trim strip between the one part of each of the clamps and the supporting surface.

The connection provided by this known clamp is quite firm and lasting, and can be easily and quickly carried out. However, it is difficult, if not impossible, to avoid scratching the surface of the support area both by the trim strip clamp and by the clamped edge portion of the trim stirp. Both parts must slide across the support surface during connection and scrape or scratch the enamel on the support surface in the process. Because the enamel generally has not yet fully cured, it can be scraped or scratched down to bare metal. The exposed metal is subject to rust which defeats one of the primary purposes of the enamel.

Furthermore, the T-shaped studs must be mounted in the window frame at the proper distance from the edge of the frame so that when the trim strip is assembled to the clamps, the entire length of the trim strip hugs the edge of the support surface.

SUMMARY OF THE INVENTION

It is an important object of this invention to provide an improved clamp of the type described which facilitates connection to a T-shaped stud fastened to a painted support surface, and connection of a trim strip to spaced ones of the clamps in a manner such that neither the clamp nor the trim strip damage the paint on the support-surface when the clamp and the trip strip are being connected, and wherein hugging engagement between the trim strip and the edge of the support surface is reliably obtained.

The invention solves the above described problems by forming the clamp of three spaced, superposed legs, wherein the middle leg, and one outer leg are constructed to clamp an inwardly extending projection on the trim strip, and wherein the middle leg and the other leg are constructed to solidly clamp against both the top and bottom of the head of the T-shaped stud.

With this construction, neither the clamp nor the trim strip projection comes into contact with the support surface, and scratcing of the paint on that surface and the ensuing rusting are reliably avoided. Furthermore, the clamp of this invention offers the advantage that it provides more space for fastening the trim strip projection than when this portion is clamped only by the stud.

Still further, proper positioning of the trim strip against the edge of the support surface and against other adjacent surfaces is not impeded by variations in position of the studs on the support surface so long as such remain within reasonable tolerances. Rather, the trim strip can always be made to lie flat against the edge of the support surface, e.g., the edge of an automobile window frame, even when the T-shaped studs are not welded on the support surface in a straight line.

The clamping principle proposed by the invention might be implemented, for instance by an S-shaped clamp having three interconnected legs. The clamping force provided by a clamp so made using a conventional thickness of sheet metal of about 0.5 mm would likely not be enough to ensure the required reliable and permanent fastening in place of the trim strip. This clamping force might be increased by making the spring sheet metal thicker, but in that case assembly problems would arise because the trim strip clamps typically are pressed by hand (plugged) onto the T-shaped studs.

Therefore, according to another feature of the invention, it is particularly advantageous that the two outer legs of the clamp define a C-shape and be connected by a bridge which extends across the entire width of the clamp, and that the middle leg be bent inwardly from the free end of the lower of the outer legs and extend rearwardly toward the bridge and between the outer legs. This increases the clamping force of the clamp compared to the S-shaped clamp described above, and the increase in clamping force is appreciable. In this version of the invention, the lower leg is pressed against the head of the T-shaped stud not only by the spring force of the middle leg, but also by the spring force of the upper leg acting against the fastening projection of the trim strip.

DETAILED DESCRIPTION

Figure 1:
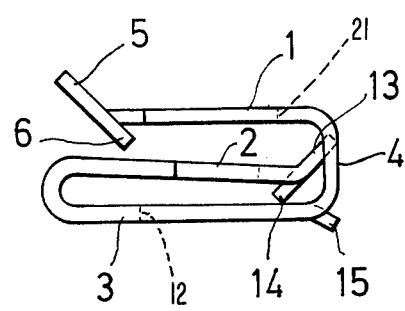
FIG. 1 is a side view of a preferred form of trim strip clamp embodying the present invention.
Figure 2:
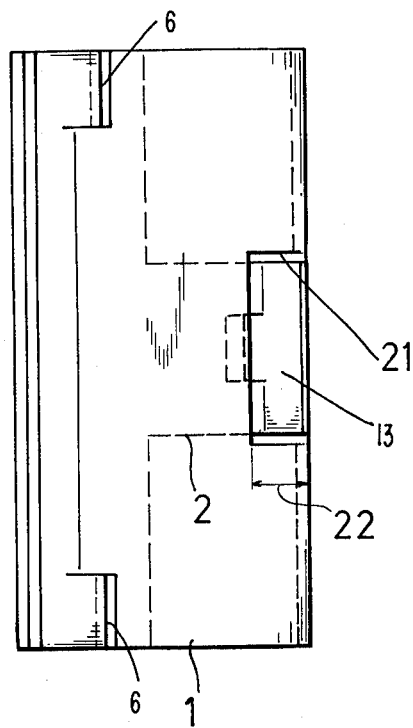
FIG. 2 is a top plan view of FIG. 1.

The clamp of the present invention is shown in FIG. 1 and includes upper and lower legs 1 and 3, respectively joined together at the rear by a bridge 4. A middle leg 2 is bent inwardly from the free end of the lower leg 3 and extends rearwardly toward the bridge 4 and between the upper and lower legs 1, 3. The upper leg 1 is formed at its front end with an oblique projection 5 which has downwardly pointing claws 6 at both ends (see FIG. 2).

Figure 4:
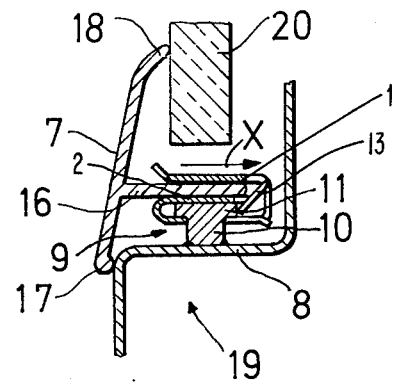
FIG. 4 is a cross-section view on a reduced scale, of the clamp of FIGS. 1–3 shown connected to a T-shaped stud welded to a support surface, and with a trim strip clamped thereby.

As shown in FIG. 4, the clamp is used to fasten a trim or protective strip 7 on a support suface 8, which may be the inside surface in a window frame 19 of an automobile body. The clamp is attached to a T-shaped stud 8 which includes a shank 10 and a head 11 previously mounted on the support surface 8 by welding or other suitable means. A plurality of studs 9 are provided at spaced positions along surface 8, and each has a clamp attached thereto in the manner shown in FIG. 4.

The middle leg 2 of the clamp is formed with an oblique projection 13 at its end facing the bridge 4. The projection 13 inclines in the direction the clamp is pressed onto connection with or plugged onto the head 11 of the T-shaped stud 9, this direction being illustrated at "X" in FIG. 4. Projection 13 also forms a locking beak 14 which angles rearwardly of the direction "X" and extends toward and into engagement with the lower leg 3. The beak 14 glides over the stud head 11 when the clamp is plugged onto the T-shaped stud 9, and then moves downwardly under the resilient force of the middle leg 2 to a position behind the head 11 as shown in FIG. 4. In this position, the clamp is securely fixed to the T-shaped stud 9.

Figure 3:
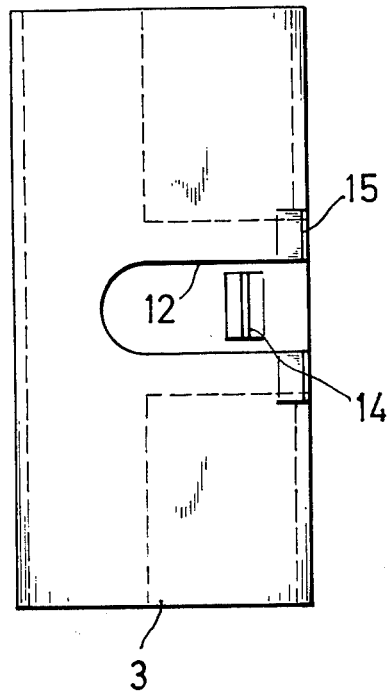
FIG. 3 is a bottom plan view of FIG. 1.

To facilitate assembly of the clamp onto the T-shaped stud 9, the lower leg 3 is formed with guide beaks 15 which slope downwardly at the rear end of leg 3 adjacent bridge 4. In addition, and as shown in FIG. 3, the lower leg 3 is provided with a U-shaped slot 12 extending from the bridge 4 forwardly into leg 3. The slot 12 is somewhat wider than the shank 10 of the T-shaped stud 9 but is narrower than its head 11. Bridge 4 is formed with a cut-out 21 which joins with the slot 12. The width of cut-out 21 is larger than the diameter or width of the head 11 of the T-shaped stud 9, and it extends a short distance 22 into the upper leg 1. This allows the oblique projection 13 on the middle leg 2 to move upwardly when the beak 14 engages the stud head 11 during assembly of the clamp onto the stud 9.

The spacing between the middle leg 2 and the lower leg 3 depends on the thickness of the head 11 of the T-shaped stud 9. Preferably, the legs 2 and 3 are joined at an acute angle, as shown in FIG. 1, but are parallel when the clamp is assembled to the stud 9, as shown in FIG. 4.

As shown in FIG. 4, the trim strip 7 comprises an inwardly extending projection 16 and a pair of rims 17, 18. When the trim strip 7 is to be clamped in place, the projection 16 is pressed in between the upper leg 1 and the middle leg 2 of each of the clamps and to such a depth that the trim strip 7 rests firmly by means of its two rims 17 and 18 against the adjoining surfaces, for instance the edge of window frame 19 and a window pane 20. Because of the spreading of the upper leg 1 of the clamp away from lower leg 3 caused by the inserted projection 16, the lower leg 3 is pressed still more firmly against the head 11 of the T-shaped stud 9 so that an effective and permanent fastening of the trim strip 7 has been ensured. Also, claws 6 at both ends of oblique projection 5 help to hold the trim strip projection 16 in place between clamp legs 1, 2.

By the foregoing, there has been disclosed an improved clamp for fastening trim or protective strips on support surfaces, and while a preferred embodiment has been illustrated and described in detail, various additions, substitutions, modifications and omissions may be made thereto without departing from the spirit of the invention.

What is claimed is:

1. A clamp for fastening trim or protective strips on a support surface having T-shaped studs mounted thereon, said studs having a head and a shank, said trim strip having an inwardly extending projection, said clamp being formed from a one-piece strip of sheet metal and having three spaced superposed legs, the middle one of said legs together with an outer one of said legs constructed to clamp said trim strip projection therebetween, the other of said outer legs being formed with a slot which receives the shank of said stud, said other outer leg and said middle leg clampingly engaging the top and bottom of the head of said stud, said outer legs being joined at the rear of said clamp across the width thereof, by a bridge, said middle leg being bent inwardly from the free end of said lower leg and extending towards said bridge and between said outer legs.

2. A clamp as claimed in claim 1, said bridge including cut-out joined with said slot and being wider than the width of the stud head, said cut-out extending partly into the upper leg.

3. A clamp is claimed in claim 2, said middle leg having an oblique projection inclined in the direction the clamp is assembled on the stud, said projection defining a locking beak sloping rearwardly of said direction and adapted to engage behind said stud head.

4. A clamp as claimed in claim 3, said oblique projection extending from the end of the middle clamp leg adjacent said bridge and into the cut-out.

* * * * *